Nov. 9, 1954 P. B. ZEIGLER ET AL 2,693,612
WINDOW WIPER AND DEFROSTER UNIT
Filed May 25, 1949 3 Sheets-Sheet 1
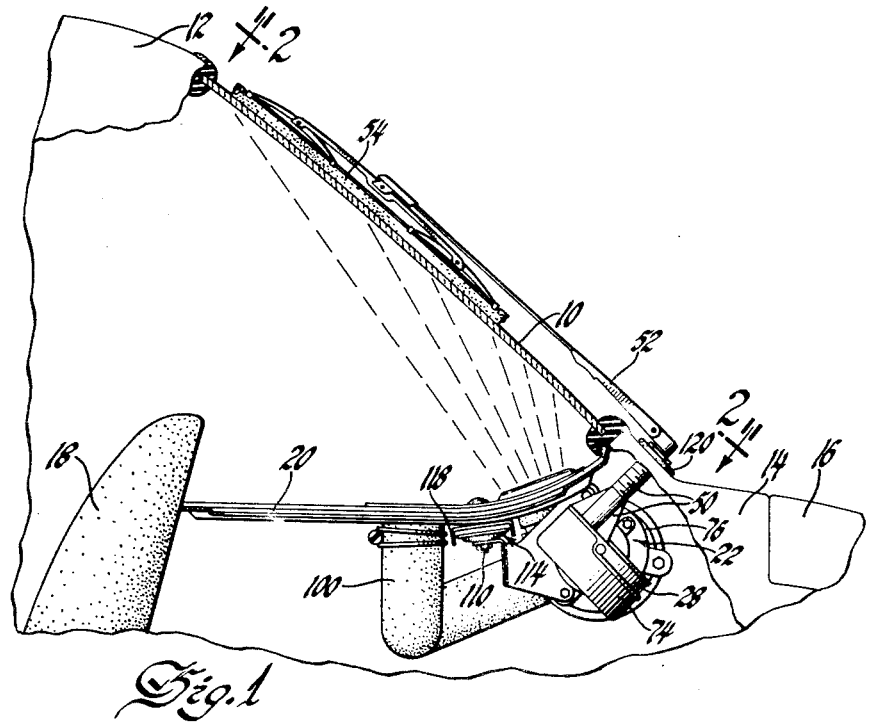
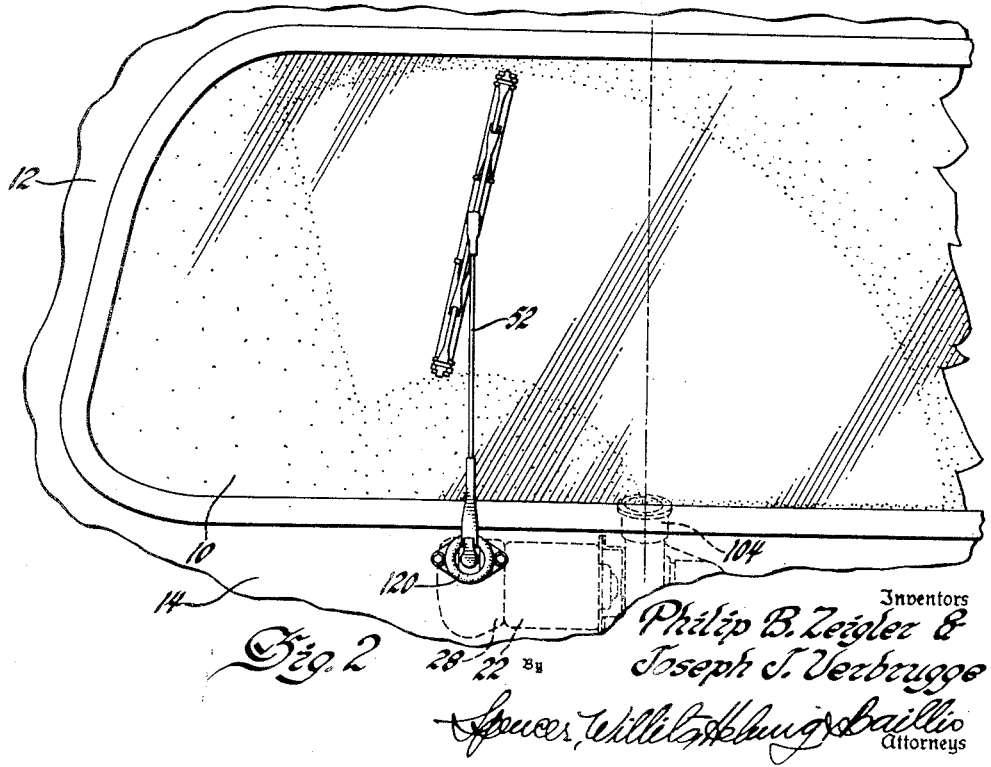

Nov. 9, 1954  P. B. ZEIGLER ET AL  2,693,612
WINDOW WIPER AND DEFROSTER UNIT
Filed May 25, 1949  3 Sheets-Sheet 2

Inventors
Philip B. Zeigler &
Joseph J. Verbrugge
By
Spencer, Willits, Helmig & Baillie
Attorneys Nov. 9, 1954   P. B. ZEIGLER ET AL   2,693,612
WINDOW WIPER AND DEFROSTER UNIT
Filed May 25, 1949   3 Sheets-Sheet 3

Inventors
Philip B. Zeigler &
Joseph J. Verbrugge
By Spencer, Willis, Helwig & Baillio
Attorneys

United States Patent Office 2,693,612
Patented Nov. 9, 1954

2,693,612

WINDOW WIPER AND DEFROSTER UNIT

Philip B. Zeigler and Joseph J. Verbrugge, Saginaw, Mich., assignors to General Motors Corporation, Detroit, Mich., a corporation of Delaware Application May 25, 1949, Serial No. 95,316

3 Claims. (Cl. 15—250.4)

The present invention relates generally to a window wiper and defroster unit which is adapted particularly for cleaning the outside surface and defrosting the inside surface of the rear window of an automobile when vision is obscured by rain, snow or frost or when the window glass is clouded by moisture of condensation.

One object of the invention is to provide a window wiper and defroster unit which consists of an electrically driven device having a wiper blade to clean the exterior surface of the rear window and a blower to direct a stream of air over the interior surface of the window.

A further object is to provide a unit of this type which is simple in construction and efficient in operation and wherein the several parts are compactly arranged to occupy a minimum of space and to facilitate the installation of the unit.

A further object involves the installation of the unit so that it will be substantially concealed within the rear part of the automobile with the wiper shaft extending through the rear panel below the window and with air ducts so arranged as to use the slightly heated air from the interior of the automobile for defrosting.

Other objects and advantages of this invention relating to the arrangement and operation of the related parts and to various details of construction will be apparent from the following description of the embodiment shown in the accompanying drawings.

In the drawings:

Fig. 1 is a fragmentary side view of a portion of the rear end of an automobile, with parts thereof broken away and in section, showing the relative location of the window wiper and defroster unit.

Fig. 2 is a fragmentary elevation on line 2—2 of Fig. 1 with parts of the wiper and defroster unit shown in dotted lines.

Figure 7:
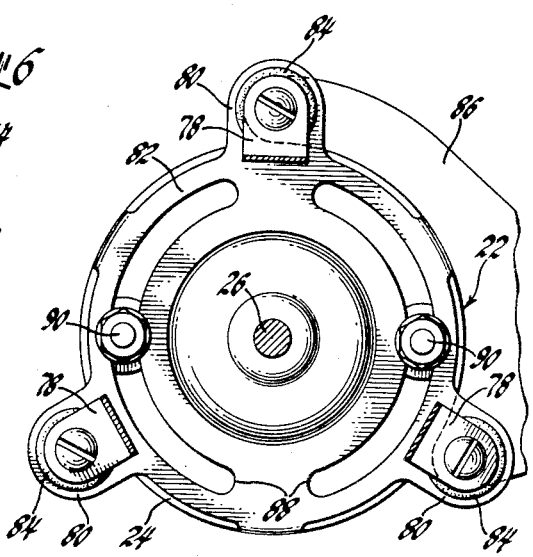
Fig. 7 is a detail section taken substantially on line 7—7 of Fig. 4.

Referring first to the showing in Fig. 7, the portion of a conventional automobile which is illustrated therein includes the rear window 10, roof 12, rear body panel 14, trunk lid 16, the upper part of the rear seat back 18, and what is commonly termed a package tray or shelf 20 which is a substantially horizontal panel or wall extending from the rear seat to the rear body panel to separate the passenger space from the trunk compartment.

The present window wiper and defroster unit is shown as installed beneath the package tray or shelf 20 and includes an electric motor, indicated generally at 22, which is provided with a motor housing 24 and a motor shaft 26 extending beyond both ends of the housing to be connected to the wiper and defroster mechanisms which are respectively located at opposite ends of the motor housing.

The wiper mechanism includes a gear housing 28 which is secured on one end of the motor housing 24 and provided with a bearing for a shaft 30. A worm 32 on the motor shaft 26 meshes with a gear 34 on one end of the shaft 30 and a crank arm 36 is secured to the other end of shaft 30 and connected to one end of a link 38 by a crankpin 40. The other end of the link 38 is connected by a crankpin 42 to a rock arm 44 fixed on a bushing 46 which is rotatably mounted on a rockshaft 48 journaled within a bearing in an elongated boss 50 on the gear housing 28.

When the wiper and defroster unit is mounted in the manner to be hereinafter described, the rockshaft 48 extends outwardly through the rear body panel 14 and any suitable wiper arm 52 provided with a blade assembly including a wiper blade 54 is secured on the outer end of shaft 48. It will be apparent that the rock arm 44 will be oscillated through the crank and link connection thereof to the motor and the oscillating movement of the arm 44 is adapted to be transmitted to the rockshaft 48 by an overload clutch which disengages when some outside source prevents the wiper blade from passing through its normal stroke.

Figure 3:
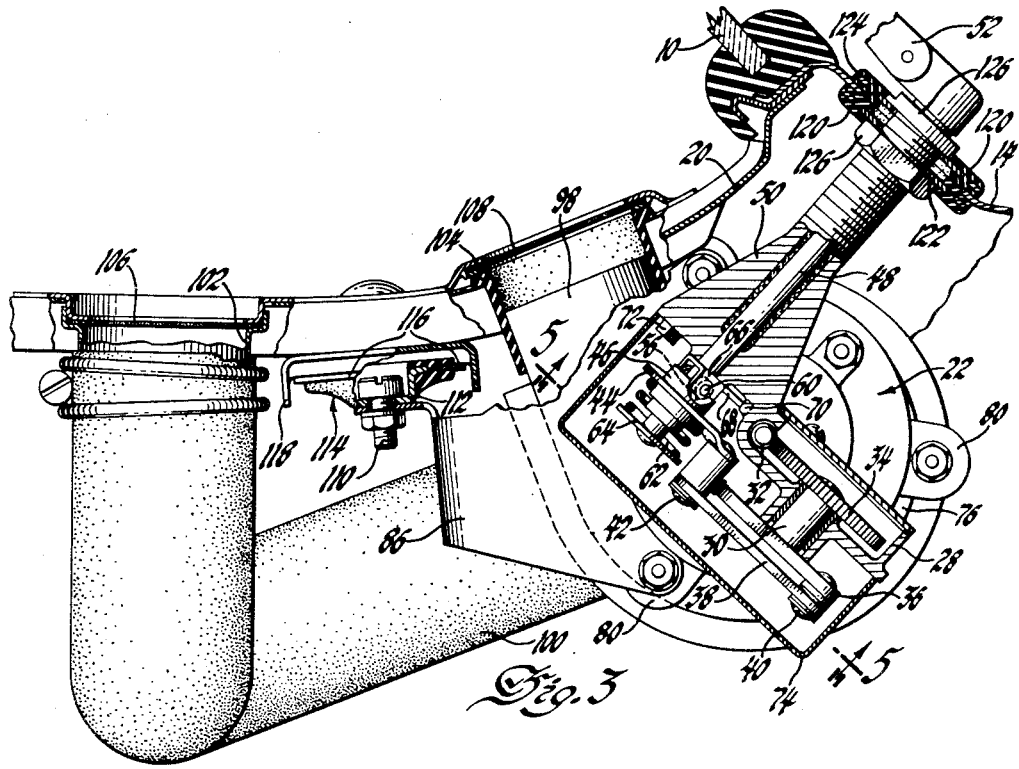
Fig. 3 is an enlarged side elevation, partly in section, of the unit and adjacent parts of the automobile.
Figure 5:
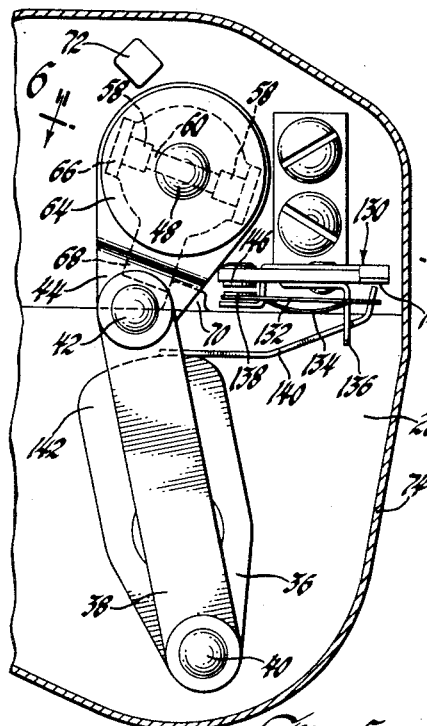
Fig. 5 is a detail section, with parts broken away, taken substantially on line 5—5 of Fig. 3.
Figure 6:
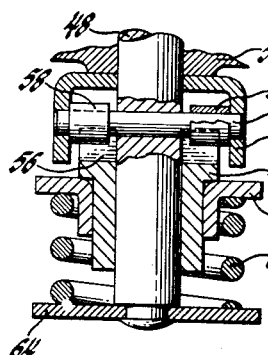
Fig. 6 is an enlarged fragmentary section taken substantially on line 6—6 of Fig. 5.

As shown in Figs. 3, 5 and 6, this overload clutch comprises a V-shaped notch 56 in the bushing 46 at each side of the shaft 48 to receive rollers 58 on a pin 60 which extends through the shaft 48 with a compression spring 62 between a washer 64 on the inner end of shaft 48 and the arm 44 on the bushing 46 to normally hold the notch in driving engagement with the rollers. To secure the pin 60 and rollers 58 to the shaft, the ends of the pin may extend through the bent ears of a plate 66. This plate 66 is also formed with an extension 68 which is adapted to contact stop lugs 70 and 72 on the housing 28 to limit the oscillation of shaft 48 and prevent the wiper blade from being moved outside of or beyond its normal arc of travel. As shown in Fig. 3, a cover 74 is secured to the gear housing 28 to enclose the crank and link connection and the overload clutch.

Figure 4:
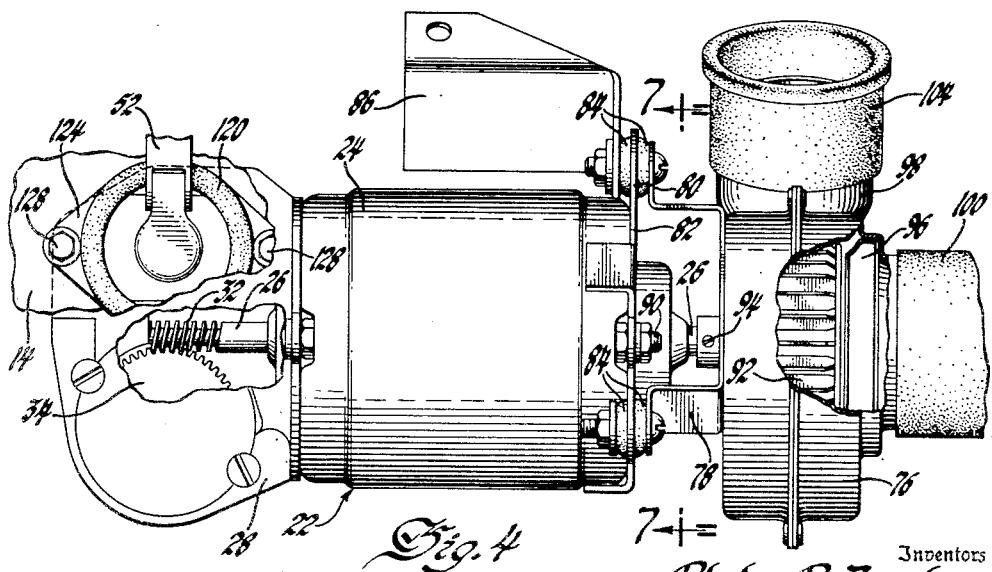
Fig. 4 is an enlarged fragmentary rear elevation with parts broken away.

The defroster mechanism includes a blower housing 76 which is secured to the other end of the motor housing 24. As shown in Fig. 4, a bracket 78 on the blower housing is connected to spaced ears 80 on a mounting plate 82 by screws and nuts with rubber grommets 84 on each side of the plate 82 to prevent the transmission of noise and vibration. A support bracket 86 is connected to two of the ears 80 and as shown in Fig. 7, the plate 82 is provided with arcuate slots 88 for the bolts 90 which secure the plate to the motor housing to permit adjustment of the mounting plate to facilitate the installation of the wiper and defroster unit as will be hereinafter described.

An air impeller or blower 92 within the housing 76 is secured on the end of the motor shaft 26 by set screw 94 and is adapted to draw air through an inlet 96 in the housing and discharge the air peripherally through an outlet passage 98 in the housing. The inlet 96 is connected by a flexible rubber duct or tube 100 to an air intake fitting 102 in the shelf 20 so that the air supply to the blower is taken from the interior of the vehicle, and a rubber nozzle 104 is mounted on the outlet passage 98 and extends through the shelf 20 near the rear window 10 to direct the stream of air from the blower over this window. As shown in Fig. 3, a screen 106 is provided at the air intake fitting 102 and a screen 108 is also mounted on a plate above the shelf 20 over the outlet nozzle 104.

To absorb vibration and reduce the noise of operation, the wiper and defroster unit is preferably mounted or supported by means of suitable rubber joints as shown in Fig. 3. The support bracket 86 is secured by bolt 110 to the inner metal cup 112 of a vibration damper 114 having yielding material such as rubber between this cup and an outer metal plate 116 which is secured to a reinforcing channel member 118 under the package tray or shelf 20. The elongated boss 50 on the gear housing 28 extends through the rear body panel 14 and is supported by the vibration dampers 120 which are clamped against opposite sides of the panel. Each of these dampers comprises an inner metal washer 122 with rubber between this washer and an outer metal washer 124. The inner metal washers 122 are positioned on the threaded boss 50 by nuts 126 and the outer metal washers 124 are secured together by clamping bolts 128 shown in Fig. 4 which extend through the panel 14.

This mounting of the unit is facilitated by the adjustable connection between the mounting plate 82 and the motor housing which has been heretofore described. As shown in Fig. 7, the arcuate slots 88 in plate 82 permit a rotatable adjustment of plate 82 on the motor housing and this provides for an angular adjustment of the support bracket 86 relative to the boss 50 to position these members with reference to the respective supports on the shelf 20 and rear panel 14 which may vary slightly in their relative locations for different installations of these units. Since the blower housing 76 is secured on the mounting plate 82 by bracket 78, it will also be apparent that the rotatable adjustment of plate 82 on the motor housing provides for an adjustment of the location of outlet passage 98 of the blower housing with reference to the boss 50 to adapt the unit for installations in which the angular dispositions of the shelf 20, body panel 14 and rear window 10 may be somewhat different than is shown in Fig. 3.

The control circuit for the present wiper and defroster unit includes a limit switch, indicated generally at 130 in Fig. 5, which functions whenever operation of the unit is manually discontinued to automatically open the motor circuit to stop the movement of the wiper blade with the blade adjacent the molding at the bottom of the rear window at one end of its stroke, as will be hereinafter described.

The limit switch 130 per se may be of any conventional construction and is only generally shown in Fig. 5 as including a spring contact blade 132 with a central bowed portion 134 which engages the bracket 136 at its free end. A contact 138 is provided on one end of the blade 132 and the other end of the blade engages around one arm of a lever 140 which is fulcrumed on the bracket 136. The other arm of lever 140 is positioned in the path of movement of a cam 142 which constitutes an extension on the crank arm 36 and the downward movement of this end of the lever is limited by contact of the other end of the lever with a ledge 144.

For present purposes it is believed to be sufficient to note that the switch and lever arrangement is such that the contact 138 is tensioned to normally engage a relatively fixed contact 146 but is moved away from such contact whenever the cam 142 engages and tilts the lever 140 as the cam moves past the lever during counterclockwise rotation of the crank arm 36. In Fig. 5 the switch 130 is shown as having been opened by the cam and it will be seen that in this position of the several parts the extension 68 of plate 66 which is connected to the wiper shaft 48 is adjacent the stop lug 70 which indicates that the wiper blade is at one end of its stroke.

Figure 8:
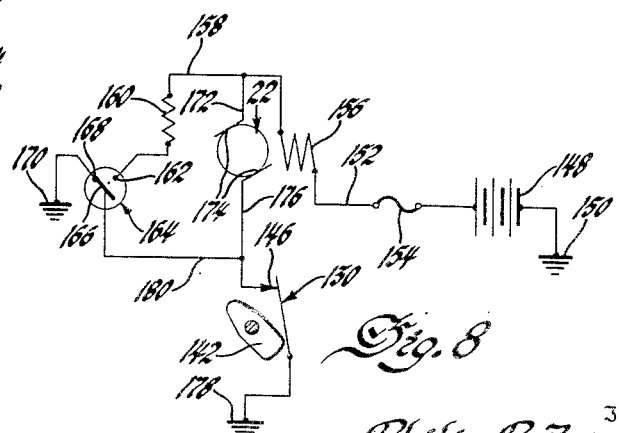
Fig. 8 is a schematic wiring diagram of the control circuit for the unit.

Referring now to Fig. 8, the control circuit is diagrammatically shown as including the usual automobile battery 148 grounded at 150 which is connected by conductor 152 having a conventional fuse 154 with the field 156 of the electric motor 22. A conductor 158 connects the other side of the motor field through a resistance 160 to the terminal 162 of a manually operable switch indicated generally at 164 having a contact arm 166 which is movable to engage either the terminal 162 or a terminal 168 grounded at 170. The conductor 158 is connected between the field 156 and resistance 160 by conductor 172 to the armature 174 of the motor 22 which is then connected by conductor 176 to the contact 146 of limit switch 130 with the movable contact of this switch grounded at 178. The conductor 176 is connected between armature 174 and contact 146 by conductor 180 to the contact arm 166 of the manual switch 164.

The control circuit is shown in Fig. 8 with the contact arm 166 of the manual switch in engagement with the terminal 168 which completes the "on" or normal operating circuit for the electric motor in which current from the battery passes through conductor 152, motor field 156, conductors 158 and 172, motor armature 174, conductors 176 and 180, switch contact arm 166 and terminal 168 to ground 170. In this position of the manual switch it will be noted that the limit switch 130 is not included in this operating circuit so that the periodic opening and closing of the limit switch by the cam 142 during the rotation thereof will have no effect on the continuous operation of the motor.

When the manual switch is operated to its "off" position in which the contact arm 166 engages terminal 162, current from battery 148 passes through conductor 152, motor field 156, conductors 158 and 172, motor armature 174, conductor 176 and limit switch 130 to ground 178, and current also passes from conductor 158 through the resistance 160, terminal 162, switch contact arm 166, and conductor 180 to conductor 176 to place the resistance 160 in shunt with the armature 174. This represents what may be termed a parking circuit and it will be seen that when the cam 142 operates the limit switch 130 to its open position the operating circuit will be automatically broken at contact 146 to stop the motor.

As has been heretofore described, the limit switch arrangement is such that the switch contacts will be opened by the rotating cam 142 at a time when the wiper blade is adjacent one end of its stroke. Since the resistance 160 is placed in shunt with the motor armature when the manual switch is moved to its "off" position as noted above, the normal operating speed of the motor will be reduced which thereby reduces the momentum of the moving parts and coasting thereof after the limit switch opens so that the wiper blade will come to rest closely adjacent the molding at the bottom of the rear window as indicated by the positions of the cam and wiper operating parts in Fig. 5.

Although a specific embodiment has been shown and described herein, it will be understood that the present invention is not limited to the exact details thereof but various changes and modifications may be made within the scope of the invention as defined in the claims appended hereto.

We claim:

1. In a combined wiper-defroster unit for an automotive vehicle body window wherein the window to be wiped from the outside and defrosted from within the passenger compartment is disposed at an angle in respect to exterior and interior body members extending from said window below all lines of vision therethrough, the said wiper-defroster unit being located within the vehicle body and composed of a wiper section including power driving means and an oscillating windshield wiper shaft driven thereby extending through said exterior body member to a point adjacent said window substantially normal thereto and a defroster section including a blower driven from said power driving means, said blower being provided with an intake passage from a zone of relatively warm air within said passenger compartment and a discharge passage communicating through said interior body member directing said relatively warm air to said window behind the area wiped by said wiper, means mounting said wiper-defroster unit to a body member, and means fixable about the axis of rotation of the power drive means to said power drive means and said mounting means adapting the wiper section and the defroster section to accommodate different angularities of the interior body member in respect to the said window.

2. In a vehicle having a window, an exterior body panel and an interior body panel both extending from said window out of line of vision therethrough, a wiper-defroster unit disposed beneath said body panels composed of an electric motor having a shaft, wiper mechanism including a wiper shaft with driving connections between said motor shaft and wiper shaft to oscillate said wiper shaft, said wiper shaft extending outwardly through said exterior body panel and provided with a wiper blade adapted to engage the exterior surface of said window, and a defroster mechanism driven by said electric motor discharging air through said interior panel against the interior of said window, means including an arcuately slotted plate disposed normal to the longitudinal axis of said electric motor supporting said wiper-defroster unit below said body panels permitting orientation of the defroster and wiper mechanism in respect to each other and said interior body panel and window, and clutch means disposed in said wiper mechanism declutching said wiper shaft in event of stoppage of said wiper blade from a source preventing movement thereof through its normal stroke whereby to permit uninterrupted operation of said defroster unit.

3. In a vehicle having a rear window, a body panel below said window and a substantially horizontal package shelf extending from said window to an adjacent seat back, a wiper-defroster unit disposed beneath said package shelf composed of an electric motor having a shaft, wiper mechanism including a wiper shaft with driving connections between said motor shaft and wiper shaft to oscillate said wiper shaft, said wiper shaft extending outwardly through said body panel and provided with a wiper blade adapted to engage the exterior surface of said window, and a defroster mechanism driven by said electric motor discharging air through said package shelf against the interior of said window, means supporting said wiper-defroster unit below said package shelf, and means associated with said supporting means for angularly adjusting said wiper mechanism in respect to said defroster mechanism about the axis of said motor shaft whereby to permit mounting of the wiper-defroster mechanism in vehicles having various positions of angularity between said window and said shelf.

References Cited in the file of this patent

UNITED STATES PATENTS

| Number | Name | Date |
|---|---|---|
| 1,445,853 | Shaw | Feb. 20, 1923 |
| 1,642,293 | Becker | Sept. 13, 1927 |
| 2,005,581 | Gary | June 18, 1935 |
| 2,146,214 | Horton | Feb. 7, 1939 |
| 2,164,854 | Booth | July 4, 1939 |
| 2,256,477 | Herzog | Sept. 23, 1941 |
| 2,277,869 | Meyerhoefer | Mar. 31, 1942 |
| 2,318,529 | Saler | May 4, 1943 |
| 2,484,781 | Coffey | Oct. 11, 1949 |

FOREIGN PATENTS

| Number | Country | Date |
|---|---|---|
| 475,340 | Great Britain | Nov. 17, 1937 |